United States Patent
Deacon

(10) Patent No.: US 7,261,593 B1
(45) Date of Patent: Aug. 28, 2007

(54) CHILD SAFETY CLAMP

(75) Inventor: Lawrence A. Deacon, 3855 Remsen Rd., Medina, OH (US) 44256

(73) Assignee: Lawrence A. Deacon, Medina, OH (US)

( * ) Notice: Subject to any disclaimer, the term of this patent is extended or adjusted under 35 U.S.C. 154(b) by 0 days.

(21) Appl. No.: 11/605,716

(22) Filed: Nov. 30, 2006

(51) Int. Cl.
*H01R 13/66* (2006.01)

(52) U.S. Cl. ....................................... 439/574

(58) Field of Classification Search ............... 439/574, 439/371, 373, 449; 174/66, 67; 362/396, 362/427; 269/208; 248/68
See application file for complete search history.

(56) References Cited

U.S. PATENT DOCUMENTS

| | | | | |
|---|---|---|---|---|
| 3,596,084 A | * | 7/1971 | Henning et al. | ............ 362/396 |
| 4,661,895 A | * | 4/1987 | Hull | ............................ 362/427 |
| 5,472,157 A | * | 12/1995 | Lehrman | ...................... 248/51 |
| 5,743,759 A | | 4/1998 | Pudims | |
| 5,823,657 A | * | 10/1998 | Price et al. | .................. 362/191 |
| 5,865,780 A | * | 2/1999 | Tuite | ............................ 602/32 |
| 6,200,155 B1 | * | 3/2001 | Chudkosky et al. | ......... 439/371 |
| 6,618,910 B1 | | 9/2003 | Pontage | |
| 7,032,867 B2 | | 4/2006 | Johnson | |
| 7,114,988 B2 | | 10/2006 | Sato | |
| 7,144,004 B1 | | 12/2006 | Conversa | |
| 7,152,887 B2 | | 12/2006 | Pirrone | |
| 7,165,334 B2 | | 1/2007 | Ben-Gigi | |

* cited by examiner

*Primary Examiner*—Alexander Gilman

(57) ABSTRACT

A "C" clamp that can be securely fastened vertically on to a counter top. The "C" clamp having a smaller clamp mounted horizontally to the upper area of the larger vertical clamp. The smaller horizontal clamp having a metal strap designed to fasten an appliance cord.

1 Claim, 4 Drawing Sheets

VIEW FROM THE RIGHT SIDE

VIEW FROM THE LEFT SIDE

VIEW FROM THE BACK

CHILD SAFETY CLAMP

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention

Child Safety. Many years ago butcher block type table were used in kitchens for rolling out dough or for cutting different foods, or for other work needs around the kitchen. Over the years these work islands or peninsulas have evolved to where sinks and range tops are now placed in the tops, which did not cause any problems.

But with the advent of small electric appliances [mixers, fry pans, small deep fryers] electrical outlets were required. Many of these work tops have no back splash where electrical outlets [receptacles] could be installed. So the National Fire Protection Association along with the National Electrical Code committees spelled out where the outlets were to be placed. The receptacles could not be place in the top of the counters for they would get contaminated with food and liquids, so they had to be placed on the sides of the island or peninsula cabinets. (See attachment page 70-64 N.E.C.)

This situation has now created a HAZARD for little children. They can now reach the appliance cord and pull the HOT fry pan down upon themselves.

My Invention Addresses this Hazard (2) Description of Related Art
(See Attachment Form PTO/SB/08a) (Page 12)

BRIEF SUMMARY

The Child Safety Clamp is basically a C clamp larger enough to clamp onto a kitchen counter top. The clamp consist of a small top handle attached to a large bolt that runs vertically down through the top portion of the clamp. At the end of the bolt is a round dish shaped nylon or plastic washer to protect the counter top from damage. By turning the top handle in a clockwise direction the clamp tightens down on the counter top. The clamp is of sufficient height and depth to fit around the outer edge of the counter top.

The Child Safety Clamp also has a smaller clamp attached to the upper portion of the clamp. This smaller clamp attaches horizontal to the vertical structure of the larger clamp. The smaller clamp consist of a smaller handle attached to a treaded bolt that draws down on a metal strap. The smaller clamp and metal strap make it possible to securely fasten a kitchen small appliance cord.

The larger C clamp can be made of cast aluminum, steel or cast iron.

BRIEF DESCRIPTION OF THE SEVERAL VIEWS OF THE DRAWINGS

FIG. 4 is for illustrative purposes only and forms no part of the claimed design.

DETAILED DESCRIPTION OF THE INVENTION

Figure 1:
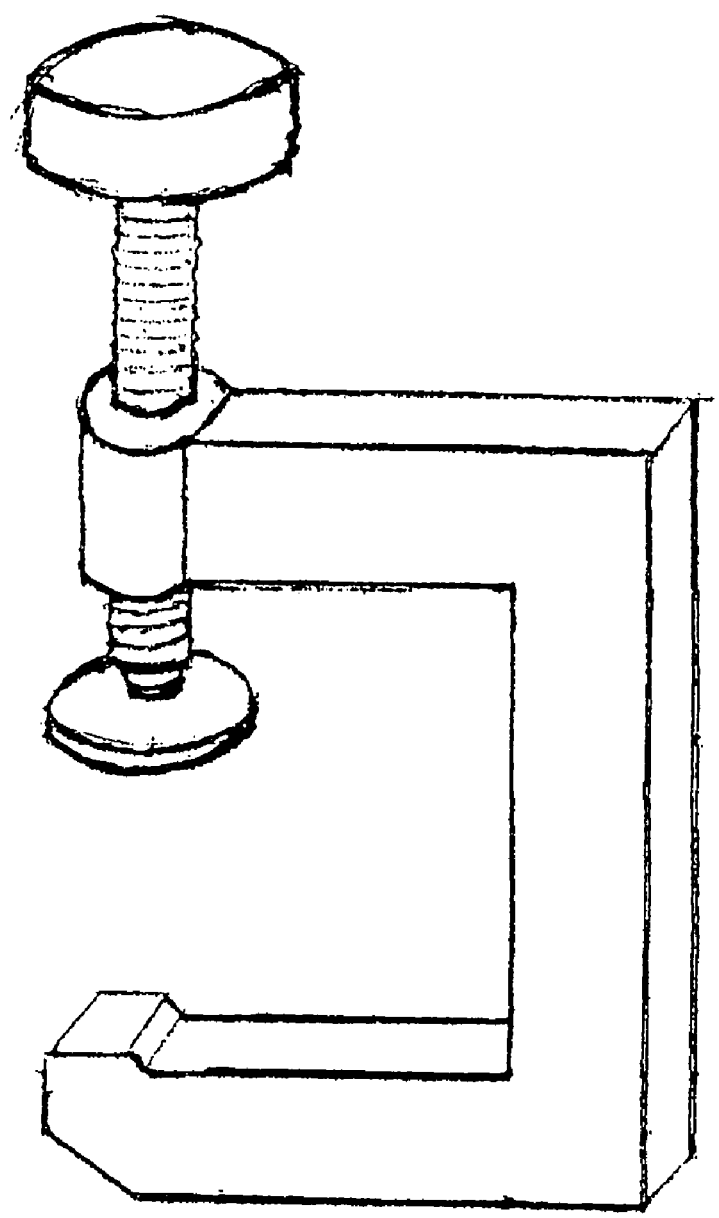
FIG. 1 shows the left side of the C clamp. The inside opening of the C clamp would be approximately 3 inches high by 2 inches deep.
Figure 2:
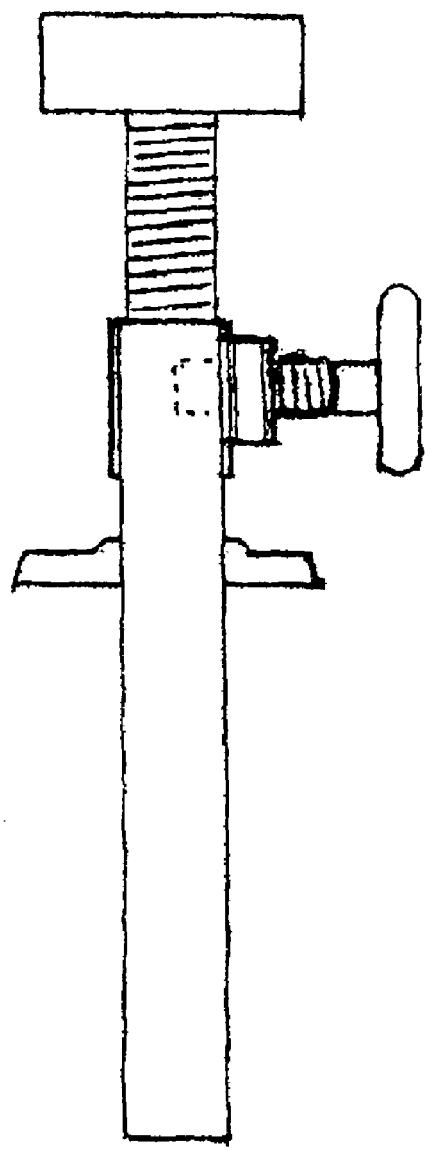
FIG. 2 shows the clamp from the back.
Figure 3:
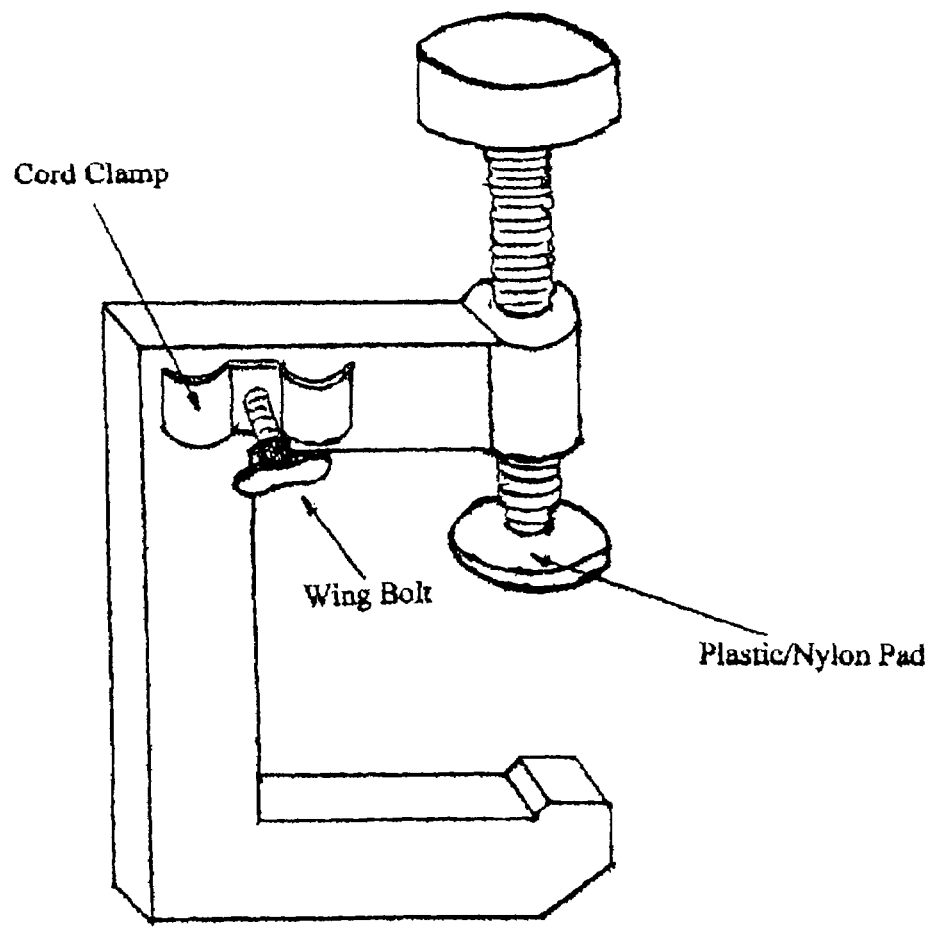
FIG. 3 shows the clamp from the right side along with the appliance clamp.
Figure 4:
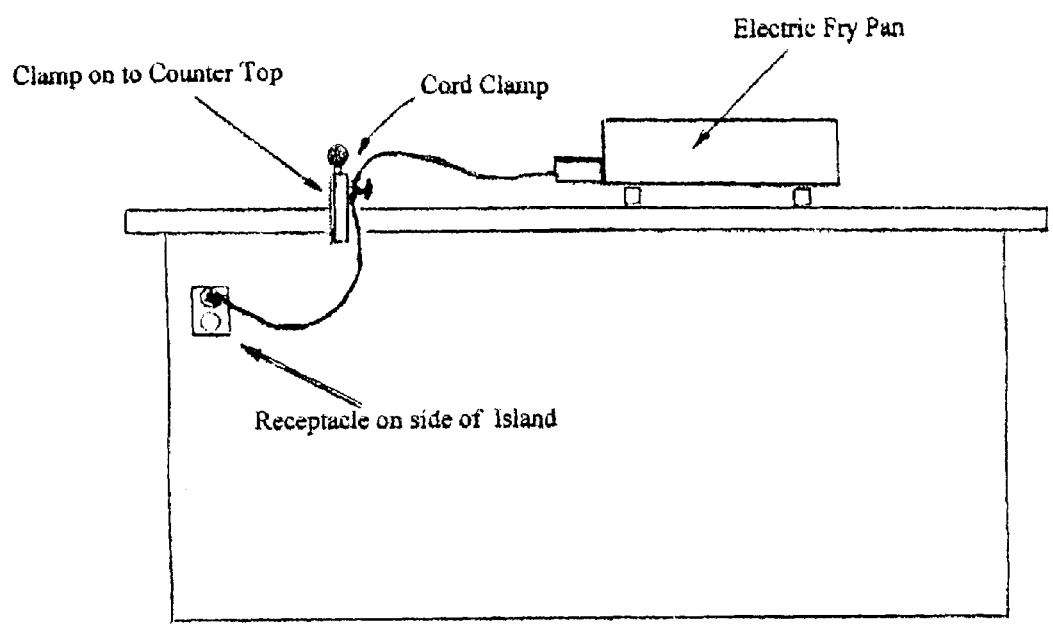
FIG. 4 shows how the clamp would be used in relation to the island cabinet, the appliance cord, and the counter top.

The C clamp can be made of a number of different metals, aluminum, steel or a combination of cast metals. This invention is not intended to remake the many C clamps that have been in the market place for years. This invention adds a secondary clamp [an additional feature] to the mechanical benefits that the current C clamps provide.

The larger C clamp would be fastened securely to the counter top. Then the appliance cord would be fastened by means of the smaller secondary clamp.

This additional clamp enables the appliance cord to be fastened [secured] to the counter top.

To protect the appliance cord from damage the secondary clamp would have a metal strap shaped similar to the letter 'm'. It would secure the cord without damage.

This configuration would enable two cords to be clamped at one time.

I claim:

1. A device for securely fastening an electrical cord of an appliance mounted on a kitchen counter top, said device comprising:
    a C-shaped clamp with an open section being fitted around a hang portion of the counter top and a large threaded bolt vertically arranged in the upper end portion of the of the C-clamp;
    a smaller threaded bolt being screwed in a threaded hole formed on an upper side surface of the C-clamp; and
    a metal strap m-shaped to adapt two electrical cords and having a central opening for the smaller threaded bolt,
wherein the large bolt having a gripping handle and a nylon pad on an opposite end contacts the counter top in a squeezing action,
wherein one or two appliance's cords being firmly attached to the C-clamp with the metal strap and the smaller bolt having a wing handle.

* * * * *